United States Patent [19]

Downs

[11] Patent Number: 4,576,479
[45] Date of Patent: Mar. 18, 1986

[54] APPARATUS AND METHOD FOR INVESTIGATION OF A SURFACE

[76] Inventor: Michael J. Downs, 'Karibu', Furze Hill Road, Headley Down, Hampshire, England

[21] Appl. No.: 495,129

[22] Filed: May 16, 1983

[30] Foreign Application Priority Data

May 17, 1982 [GB] United Kingdom ............... 8214256

[51] Int. Cl.$^4$ ............................................... G01B 9/02
[52] U.S. Cl. ..................................... 356/351; 356/359
[58] Field of Search ........................ 356/351, 359, 360

[56] References Cited

U.S. PATENT DOCUMENTS 3,958,884  5/1976  Smith ................................. 356/360
4,353,650  10/1982  Sommargren ................. 356/351 X

OTHER PUBLICATIONS

Reiter, "Polarisations Interferometer zur Autzeichnuug von Kleinen, Schnellen Winkel-und Relativbewegungen", *Frequenze*, vol. 29, No. 3, pp. 88-91, 1975.

Primary Examiner—Davis L. Willis
Assistant Examiner—Matthew W. Koren
Attorney, Agent, or Firm—Cushman, Darby & Cushman

[57] ABSTRACT

A microscope used to investigate the profile of a surface (28) comprises a laser light source (10) from which a beam of radiation passes through a collimator (12) and polarizer (16). Orthogonally polarized components are focused at different positions by a birefringent lens system (22,260). Light reflected by the surface is passed to a photodetector (36) which passes an output signal to an analyzer circuit (not shown).

8 Claims, 12 Drawing Figures

APPARATUS AND METHOD FOR INVESTIGATION OF A SURFACE

This invention relates to a device which can investigate a surface with polarised electromagnetic radiation (e.g. visible, infrared or ultraviolet) and provide electrical output signals which are related to the properties of the surface. The device may be used as a position or vibration sensor, or as a step height or roughness sensor, or as a scanning microscope, and is based on the technique of polarisation interferometry.

Early apparatus for measuring surface properties, such as the Rank Taylor Hobson Talysurf (RTM) and Talystep (RTM) relied on a stylus which was caused to traverse the surface.

In our copending patent application No. 8132745, a surface profile interferometer is described which is capable of measuring surface roughness or step height, the device using the technique of polarisation interferometry. The arrangement has the advantage that the output signal is directly related to a difference in path length between two signals, but only limited information about the surface can be derived. In the present invention, considerably more information can be obtained.

According to the invention, there is provided apparatus for investigating the properties of a surface comprising means for generating a collimated beam of radiation having components of equal amplitude in two orthogonal directions of polarisation, birefringent focusing means for focusing radiation in two directions of polarisation at different positions along the optical axis of the apparatus, axial scanning means for altering said positions with respect to the surface under investigation and phase-sensitive detector means to receive radiation from the surface and comparator means to compare corresponding parameters of radiation received from the surface in each of said two orthogonal directions of polarisation.

Usually the birefringent focusing system comprises a relatively low power birefringent lens and a relatively high power non-birefringent lens, and preferably the axial scanning means comprises means to scan the non-birefringent lens.

The effect of the axial scan is to cause repeated interchanging of the areas of intersection with a surface under investigation of the two orthogonally polarised components of the incident beam, first one component then the other being focused then defocused. The polarised beam components received from the surface then interfere, and from the frequency, phase and amplitude of the resultant beam, information about the surface can be derived. The axial scan can be regarded as having the dual effect of providing the modulation which is essential in a polarisation interferometer, and of allowing surface information to be derived.

The phase-sensitive radiation receiving means may comprise a photodetector and a phase-sensitive signal processing circuit. Frequently a microprocessor will be included in the signal processing circuit.

Usually there will further be provided second scanning means for causing relative motion in a direction transverse to the optical axis of the collimated beam of radiation and a surface under investigation.

The surface investigation device may be used in a reflection mode, when radiation will pass twice through the birefringent focusing system and will be reflected to the receiving means by beam-reflecting means which does not introduce any phase difference between radiation polarised in two orthogonal directions, or alternatively the surface investigation device may be used in a transmission mode.

Also according to the invention, a method of investigating a surface comprises illuminating the surface with a beam of radiation having components of equal amplitude in two orthogonal directions of polarisation, the components being focused at different positions along the optical axis of the device;

causing relative motion in the axial direction of the surface and the foci between the positions of the foci;

and receiving radiation from the surface and, from a comparison of the components at said two orthogonal directions of polarisation, deriving information related to the surface.

The invention will now be described by way of example only with reference to the accompanying drawings in which:

FIG. 1 is a schematic illustration of the optical parts of a surface investigation device;

FIGS. 2(a) throught 2(e) illustrate the intersection of the polarised components with a surface at five different positions during an axial scan;

Figure 1:
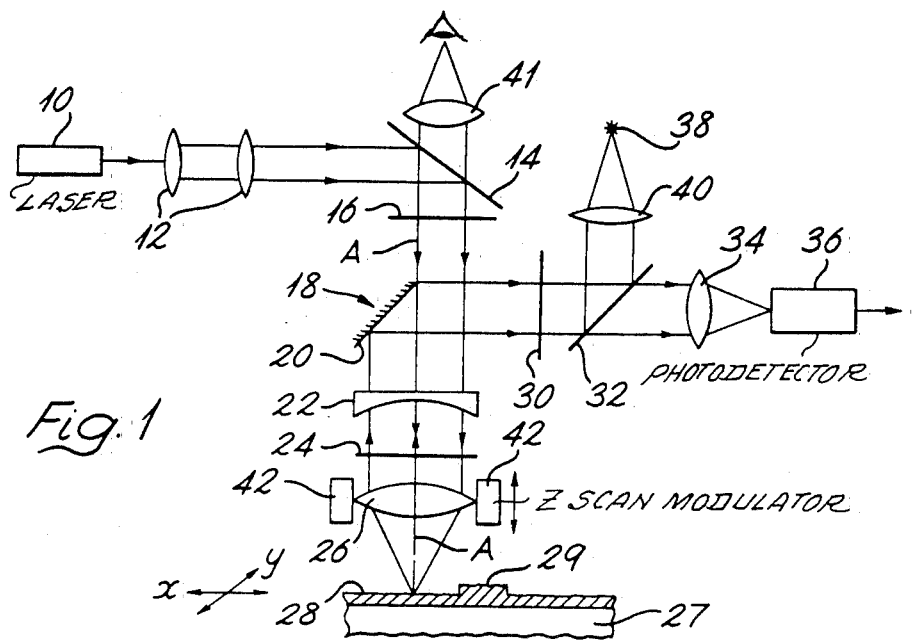

Considering first the optical paths through the apparatus, in FIG. 1 a helium neon laser 10 provides a beam of monochromatic light which passes through a beam expander 12 to a polarising beam splitter 14 which reflects some of the incident light through an angle of 90°. The collimated beam passes through a polariser 16 to a reflector 18 which intercepts half of the incident beam. The face 20 of the reflector remote from the incident beam is a mirror. The half of the beam which is not obscured by the reflector passes on one side only of the optical axis A of the apparatus through a birefringent lens 22, then through a quarter wave plate 24 and objective lens 26 to a test surface 28. Light reflected by the surface passes, on the other side of the optical axis, back through the lens 26, the plate 24, and the birefringent lens 22 to the reflecting surface 20. The reflecting surface is arranged at 45° to the returning beam which it reflects through an analyser 30 to a beam splitter 32, which transmits light to a focusing lens 34 and a photodetector 36. The beam splitter can receive light from a tungsten source 38 through a collimating lens 40, and light from this source is used in conjunction with an eyepiece lens 41 spaced from the beam splitter 14 to initially align the apparatus.

The objective lens 26 is attached to a scanning device, indicated schematically at 42, which can scan the lens 26 along the optical axis, i.e. in the z direction. The scan must be precisely linear along the optical axis with no transverse component and no tilt.

The surface 28 is supported by a scanning table 27 which can scan the surface in the x-y plane perpendicular to the optical axis.

In use the laser 10 provides a beam of plane polarised light which is expanded by expander 12. The polarising beam splitter 14 reflects this expanded beam through the polariser 16 which is set to rotate the plane of polarisation of the expanded input beam until there are beams of equal intensity in two orthogonal directions of polarisation P and S, the directions being determined by the ordinary and extraordinary axes of the birefringent lens 22. The half of the radiation which is not intercepted by the reflector 18 passes to the birefringent lens 22.

It is a property of the birefringent lens 22 that it has different refractive indices for light at different polarisations. For an incident collimated beam having both P and S components aligned with the ordinary and extraordinary axes of the birefingent lens 22, one component will be deviated more than the other, so that the focal points of the P and S components will lie at different distances from the lens. The difference in focal power for the P and S components is small, about one dioptre. The effect of the objective lens 26 is to provide a relatively powerful focusing effect, for example 100 dioptres, but a difference in focal power for the P and S components remains. The overall effect is that, at one position of the axial scan, one component of the beam, say the P component, is focused on the test surface 28 while the second component is focused at a different distance and therefore is reflected from a larger area of the surface. During an axial scan, the beams are interchanged.

The effect is illustrated in FIG. 2. Suppose FIG. 2(a) represents the position at one extreme of the scan of the lens 26, and FIG. 2(e) represents the position at the other extreme. The P beam is represented in FIG. 2 by dotted circles indicating the intersection of the circular beam with the surface 28, and the intersection with the surface of the orthogonal S beam is represented by the broken lines.

Figure 2A:
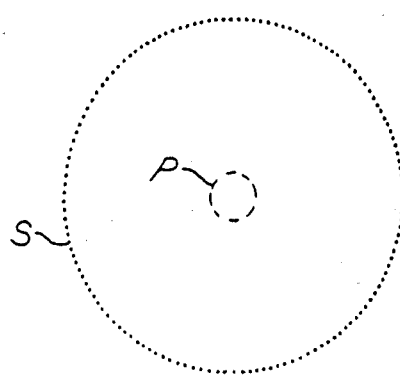

At one extreme position, FIG. 2(a), the S beam is focused on the surface as a small circle of light, while the P beam is slightly defocused and covers a larger area. As the lens 26 moves along the optical axis, the S beam becomes progressively defocused and the P beam becomes less defocused, until at a central position, FIG. 2(c), both beams illuminate the same area of the surface. As the scan continues, the S beam comes to a perfect focus at the extreme position, shown as a small circle in FIG. 2(e), while the P beam is defocused to cover a large circular area of the surface 28.

Figure 3:
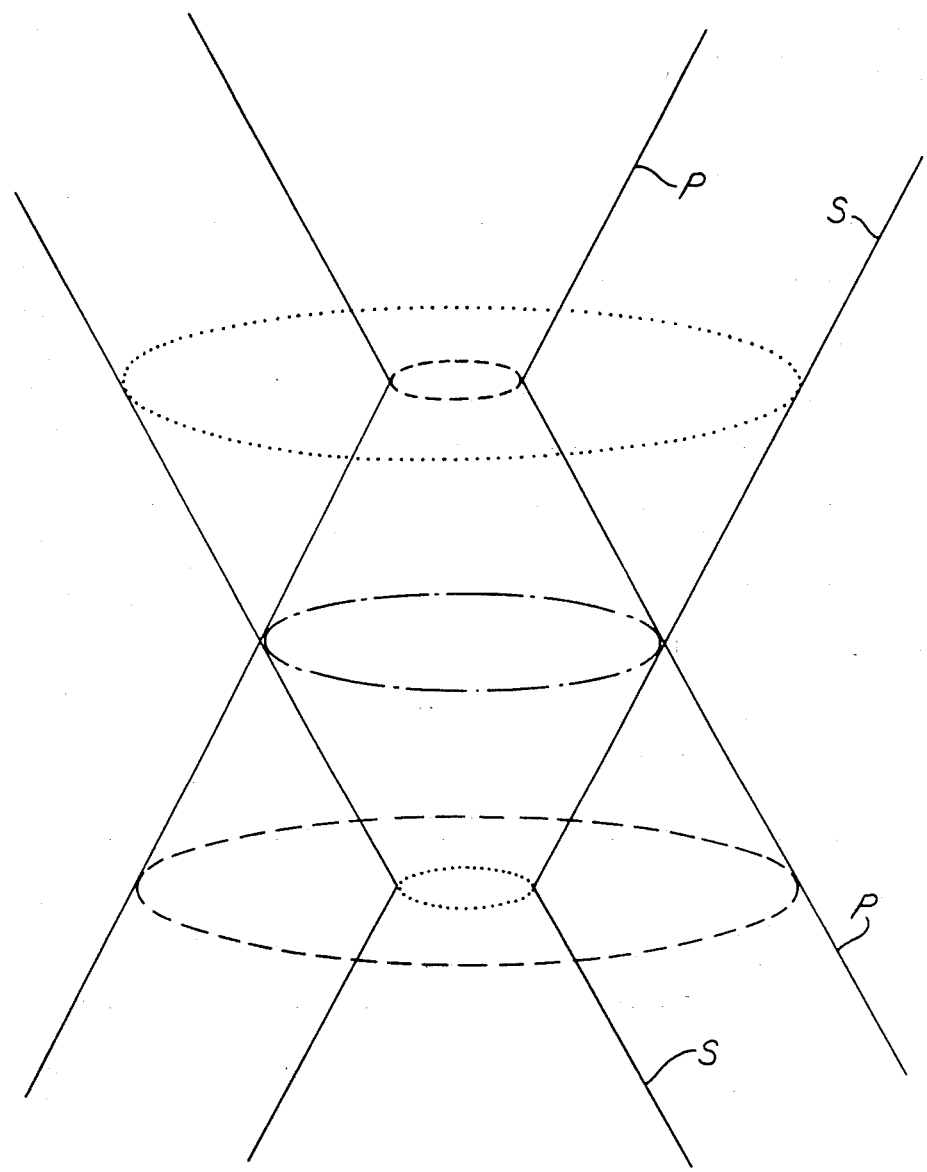
FIG. 3 illustrates the effect of axially scanning a beam having two orthogonally polarised components.

FIG. 3 shows the relationship between the P beam and the S beam at the two extreme positions and the central position in the scan.

In the FIG. 1 arrangement, the reflector 18 intercepts half of the incident circular beam, so that the beam passing through the birefringent lens 22 will be half-circular in cross-section, but for descriptive purposes fully circular component beams are used in FIGS. 2 and 3.

A typical dimension of the diameter of the area illuminated by each focused spot is less than one micron while the maximum area illuminated by each beam when unfocused may be 5 microns in diameter. A typical axial scan length is 3.5 microns. Any suitable device may be used which gives a very precise scan, for example a piezoelectric or an electromechanical scanner.

Referring once again to FIG. 1, the beams reflected by the surface pass on the other side of the optical axis back to the birefringent lens 22, after a second passage through the quarter wave plate 26 which is set at 45° to the axes of the birefringent lens. The effect of this double passage through the plate 26 is that the two beam components are inverted with respect to the ordinary and extraordinary axes of the lens 22 and the focusing effect of this lens on the components is therefore reversed. The beam component which was refracted more than the other in the first passage through the lens is now refracted less and vice versa. This allows approximate recollimation of both beams. The reflector 18 therefore receives two coincident collimated orthogonally polarised beams, the differences between the components being related to the properties of the surface from which they were reflected.

Figure 4:
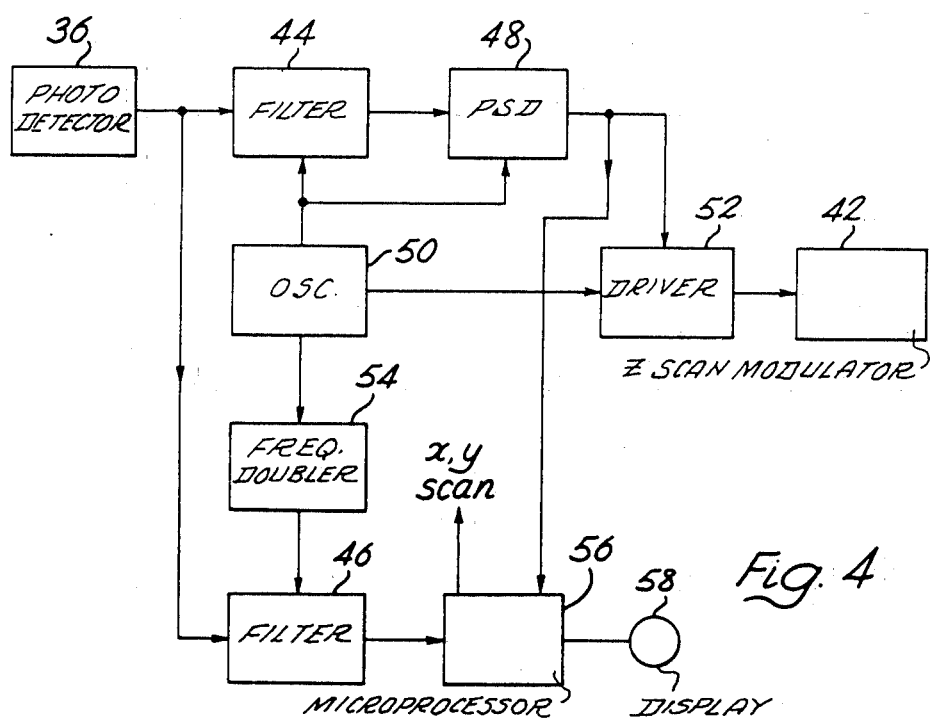
FIG. 4 is a schematic illustration of the electronic parts of a surface investigation device.

Referring now to the electronic parts of the circuit shown in FIG. 4, the photodetector 36 (see FIG. 1) is connected to first and second coherent filters 44, 46. The first filter 44 and a phase sensitive detector 48 are both supplied with a modulation timing wave by an oscillator 50. The PSD 48 supplies a D.C. signal to a modulator driver 52, and the oscillator 50 supplies the driver 52 with an A.C. signal. The driver controls the z scan modulator 42 (see FIG. 1).

The oscillator is also connected through a frequency doubling circuit 54 to the second coherent filter 46 which supplies a double frequency output to a microprocessor 56 which has a display screen 58. The microprocessor also receives a signal from the PSD 48.

The oscillator 50 causes the modulator driver 52 and the modulator 42 to scan the lens 26 along the z axis at the oscillator frequency F.

Figure 2B:
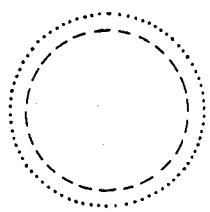
Figure 2C:
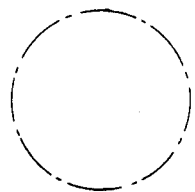
Figure 5A:
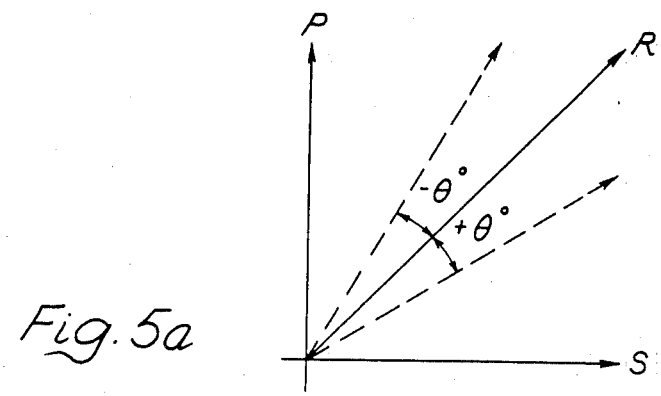
FIGS. 5(a) to 5(d) illustrate the photodetector signals.
Figure 5B:
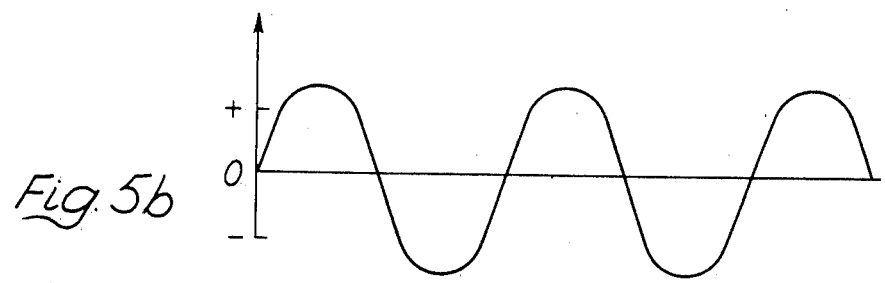

Suppose that the axial scan is at its midpoint and both the P and S beams illuminate the same area of the surface, as in FIG. 2(c) The two reflected beams will be of equal amplitude and phase and will interfere to give a resultant R at 45° to each beam as illustrated by the polar diagram in FIG. 5(a). If a modulation is applied at frequency F by the axial scan, FIG. 5(b), the effect of the interchange of the focusing effect applied to the P and S beams will be to swing the component through an angle $\pm \theta$ on each side of the 45° direction, as the intensities and phases of the P and S beams vary.

Figure 5C:
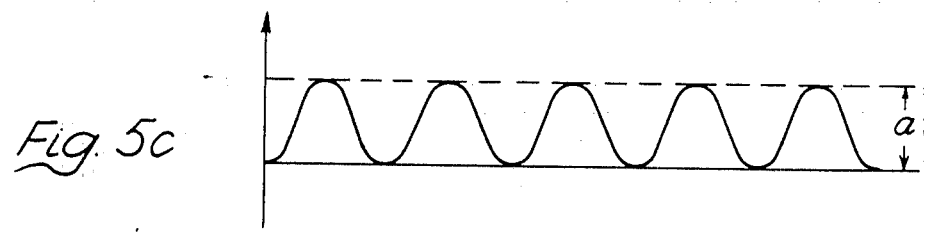

If the axial direction of the analyser 30 (FIG. 1) is crossed with respect to the unmodulated resultant R of the P and S beams, then no light (or a minimum intensity of light) will be received by the photodetector 36 when the lens 26 is in its mid-scan position. At each position of maximum scan, the maximum angular rotation of the resultant of the P and S beams will cause a maximum light intensity to reach the photodetector. Since the detector is sensitive only to intensity and not to phase, the photodetector signal varies at a frequency 2F, illustrated in FIG. 5(c), which is converted to a constant output signal of amplitude a.

Figure 5D:
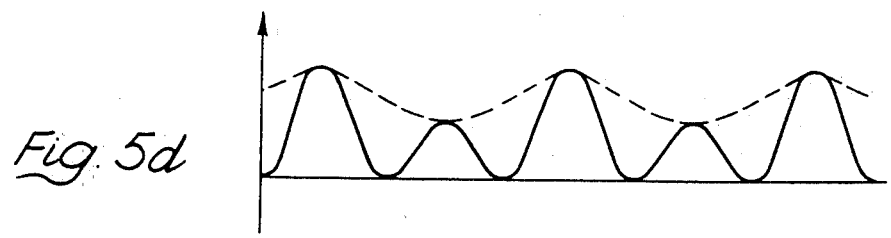

Suppose now that the axial scan gives an asymmetrical result, for example if the surface under investigation is not at precisely the midpoint of the scan. The effect will be to swing the resultant through a greater angle on one side of the analyser extinction axis than the other, so that the photodetector receives an asymmetric signal, FIG. 5(d), alternate cycles being of different amplitudes, and the photodetector output is an error signal at the modulation frequency F.

Referring now to FIG. 4, the phase sensitive detector 48 only responds to a signal from the photodetector 36 at the modulation frequency, and provides a D.C. output proportional to the asymmetry of the signal. The modulator driver causes the modulator 42 to adjust the central position of the axial scan to eliminate the error signal i.e. to act as a servo-system and give a focus lock at the position of signal symmetry.

If the D.C. signal is recorded by the microprocessor 56 and correlated with the x-y position of the sample surface under investigation, the surface profile of the sample is recorded, and can be displayed in a suitable form.

To derive the amplitude of surface profile variations, the microprocessor 56 can be calibrated either by calculation (using the numerical aperture and the powers of the lenses 22 and 26) or by calibration using a surface of known profile.

In a variation, the servo-type focus lock is disconnected, i.e. the distance of the axial scan is not adjusted, and the D.C. signal is recorded. The device then acts as a position sensor.

Consider now the apparatus when used to determine surface roughness. Referring again to FIG. 2, when, as in FIG. 2(a), the P beam is focused on the surface and the S beam is defocused, the S beam can be regarded as a phase reference beam, because the phase information it contains is averaged over a relatively large area which should be invariant across the surface 28. The focused P beam is reflected from a small area of the surface and, if the area is at a different height or level from the average surface level in the reference area, there will be a phase difference between the P and S beams. The phase difference will be reversed at the other extreme position of the axial scan, FIG. 2(e), the P beam now acting as the reference beam. The effect of the phase differences is that the amplitude of the resultant beam received by the photodetector is greater than if both the P and the S components had been reflected by areas of equal height, so that no phase shift had occurred. The resultant is received at twice the modulation frequency. Comparison of the signal amplitude of the output of the coherent filter 46 with a predetermined amplitude stored in the microprocessor 56 which corresponds to the resultant amplitude with no phase shift due to roughness allows roughness to be determined. The predetermined amplitude can be derived either by calculation or by calibration. The surface 28 under test will be moved by the scanning table in the x-y plane so that different areas are tested for roughness, and a mean value can be derived and displayed.

It is to be understood that the photodetector 36 only receives a signal if the surface 28 has some slight roughness. If the surface is perfectly flat, then no signal is received because the P and S beams are equal in amplitude and phase and their resultant is in a direction which is not transmitted by the crossed analyser 30.

In a variation of the method of measurement, the axial scan is disconnected so that the foci of the P and S beams are fixed. If the surface 28 is then vibrated, the change in amplitude of the resultant received by the photodetector will be proportional to the amplitude of the vibration. By previous calibration, the device can act as a vibration sensor.

A combination of the modulation frequency signal from the PSD 48 and the double-frequency signal from the filter 46 is useful in interpreting the form of a surface feature, such as the step-change in height of the artefact 29 in FIG. 1. The rates of change of both of the signals can be used to decode the form of the feature, such as a line on a semiconductor wafer. For example a line 0.1 microns wide and 10 microns high can be distinguished from a line 1.0 microns wide and 1.0 microns high.

It has already been stated that only one half of the circular input beam reaches the surface 28, the other half being intercepted by the reflector 18. This has the effect of halving the numerical aperture of the apparatus in one direction transverse to the optical axis, the x direction in FIG. 1, but since the full beam width is provided in the other transverse direction, the y direction, the full numerical aperture is maintained. It is therefore preferable if a straight-edge feature of the surface 28 is investigated by moving the scanning table along the direction in which the full NA is available, i.e. the y direction in FIG. 1, to maximise the resolution.

The apparatus according to the invention can also act as a microscope. If a substrate 28 under investigation is scanned in a plane transverse to the axial scan, for example in a raster scan, under the control of the microprocessor 56, and if the outputs of the PSD 48 and the coherent filter 46 are recorded in association with the scan, the microprocessor can build up a picture of the substrate surface and provide a suitable display. It is an advantage of a microscope of this form that the input beam from the laser illuminates only the area of surface under immediate investigation thus maximising the use of the laser power. This is in contrast with previous types of microscope having laser illumination in which the entire surface is illuminated simultaneously by the laser while information is received through a slit-shaped mask which is scanned across an image so that only a fraction of the reflected laser power is available.

A critical difference between known scanning microscopes and a microscope according to the present invention is that it is deliberately scanned repeatedly between a focused and an unfocused position for each beam component. The maximum information signal is provided when one beam component has the maximum defocus, i.e. at the extremes of the axial scan, and not at the central scan position which gives a "best average focus" for both beam components. The central position of the scan is the null point in the present apparatus.

Typically the apparatus according to the invention has a transverse resolution, equivalent to the optical resolution of a conventional microscope, of a fraction of a micron—the resolution is not governed by the usual Airy disc formula applicable to a conventional optical microscope and can be extremely high depending on the type of surface feature being examined.

Figure 2D:
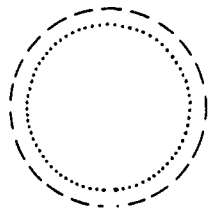
Figure 2E:
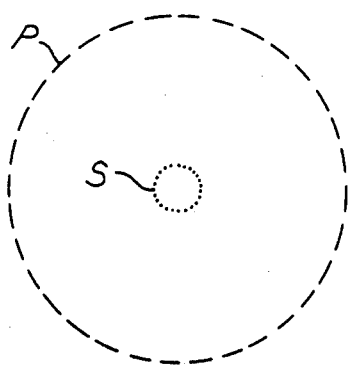

The high resolution can best be understood by reference to FIGS. 2(b) and 2(d). If a feature of the surface is of such size or at such a position that it affects one beam component but not the other, i.e. it lies in the annulus between the dotted and broken lines, the effect of the feature on one of the P and S beams can be sensed. Since the annulus thickness may be very small, e.g. a few hundredths of a micron difference can give an adequate signal, the resolution of the device is correspondingly high. The deeper the feature the larger the signal obtained.

In any application of the invention, the frequency and depth of the axial scan and the diameters of the unfocused beam components at the maximum scan positions will be chosen in accordance with the features of the surface under investigation. A typical scan may have a depth of 5 microns at a frequency of 250 Hz.

The apparatus is illustrated in FIG. 1 in an optical arrangement in which, between the birefringent lens 22 and the surface under investigation, the illuminating and reflected beams are half-circular in cross section and are contiguous along the optical apparatus. It is also possible to fully separate the beams but this reduces the resolution.

In a variation of the apparatus, the reflector 18 illustrated in FIG. 1 can be replaced by a beam splitter which does not introduce any phase difference between the beam components reflected by it, but there is then a higher risk of radiation being returned to the laser and a laser isolator may be required.

In another variation, in a transmission system used to investigate the surface of a transparent material, the reflector 18 is omitted, and the analyser 30, lens 34 and photodetector 36 are placed to receive light transmitted by the substrate after passage through a further quarter wave plate and a further birefringent lens identical to the plate 24 and lens 22.

In a further variation, the single frequency laser 10 is replaced by a Zeeman split laser providing radiation at two frequencies, and the microprocessor is suitably programmed to allow for the different input beam, the Zeeman splitting technique providing the system with high speed modulation.

An alternative method of modulating the focal positions of the beam is to introduce into the light path a rotating slab of material, such as glass, which is optically denser than the transmission medium. As the path length changes, so does the relative focal position. Preferably, a second, contra-rotating slab is also incorporated to compensate for the lateral offset introduced by the first slab.

I claim:

1. Apparatus for investigating the properties of a surface comprising means for generating a collimated beam of radiation having components of equal amplitude in two orthogonal directions of polarisation, birefringent focusing means for focusing radiation in two directions of polarisation at different positions along the optical axis of the apparatus, axial scanning means for altering said positions with respect to the surface under investigation and phase-sensitive detector means to receive radiation from the surface and comparator means to compare corresponding parameters of radiation received from the surface in each of said two orthogonal directions of polarisation.

2. Apparatus for investigating the properties of a surface as claimed in claim 1 wherein said birefringent focusing means comprises a relatively low power birefringent lens and a relatively high power non-birefringent lens.

3. Apparatus for investigating the properties of a surface as claimed in claim 1 further including lateral scanning means to move the beam of radiation relative to the surface in a direction transverse to the optical axis of the beam.

4. Apparatus as claimed in claim 3 wherein said detection means is positioned to receive radiation reflected by said surface.

5. Apparatus as claimed in claim 4 wherein said means for generating a collimated beam of radiation comprises a laser light source.

6. Apparatus as claimed in claim 5 wherein said laser light source incorporates Zeeman splitting means to generate separate components of radiation having different frequencies.

7. Apparatus as claimed in claim 3 wherein said detection means is positioned to receive radiation transmitted by said surface.

8. A method of investigating a surface comprising illuminating the surface with a beam of radiation having components of equal amplitude in two orthogonal directions of polarisation, the components being focused at different positions along the optical axis of the device, causing relative motion in the axial direction of the surface and the foci between the positions of the foci and receiving radiation from the surface and from a comparison of the components at said two orthogonal directions of polarisation, deriving information related to the surface.

* * * * *